US005485460A

United States Patent [19]
Schrier et al.

[11] Patent Number: 5,485,460
[45] Date of Patent: Jan. 16, 1996

[54] SYSTEM AND METHOD FOR RUNNING MULTIPLE INCOMPATIBLE NETWORK PROTOCOL STACKS

[75] Inventors: Evan J. Schrier, Kirkland; Thomas R. Reardon, Seattle; Aaron W. Ogus, Kirkland, all of Wash.

[73] Assignee: Microsoft Corporation, Redmond, Wash.

[21] Appl. No.: 293,998

[22] Filed: Aug. 19, 1994

[51] Int. Cl.⁶ .......................... G06F 13/00; G06F 15/16
[52] U.S. Cl. ............................ 370/94.1; 395/650
[58] Field of Search .................. 370/94.1, 79, 85.1; 395/500, 650

[56] References Cited

U.S. PATENT DOCUMENTS

| | | | |
|---|---|---|---|
| 4,654,654 | 3/1987 | Butler et al. | 340/825.5 |
| 5,224,098 | 6/1993 | Bird et al. | 370/94.1 |
| 5,325,361 | 6/1994 | Lederer et al. | 370/94.1 |

*Primary Examiner*—Douglas W. Olms
*Assistant Examiner*—Min Jung
*Attorney, Agent, or Firm*—Leydig, Voit & Mayer

[57] ABSTRACT

A system and method for operating a network client machine to simultaneously utilize two protocol stacks which implement the same protocol. The system and method routes incoming packets of information into the appropriate protocol stack by prescanning the incoming packet and comparing a portion of the packet with a table in memory of sockets used for one of the two stacks. If a match exists with any entry in the table, the system and method routes the packet to the appropriate stack. If no match is found between the incoming packet and the table, the packet may then be offered to the second protocol stack. The unique socket numbers are selected by one of the protocol stacks while both stacks maintain a table of active sockets.

24 Claims, 5 Drawing Sheets

SYSTEM AND METHOD FOR RUNNING MULTIPLE INCOMPATIBLE NETWORK PROTOCOL STACKS

FIELD OF THE INVENTION

The present invention relates generally to systems and methods for sending and receiving network communication packets to and from a client node on a computer network. More particularly, the present invention relates to a system and method for routing network packets to and from a client node which supports a plurality of protocol stacks.

BACKGROUND OF THE INVENTION

To facilitate an understanding of the invention as a novel solution to the problems presented by multiple incompatible protocol stacks, a number of basic local area network (LAN) concepts are described herein. Essentially, a LAN comprises a system of devices, such as computers, printers and other computer peripherals, which are communicatively coupled together to provide resource sharing and/or data sharing. Resources and data are shared by allowing these network devices, referred to as nodes, to communicate with other nodes on the network and to request or offer data and services from or to other nodes. By way of example, file servers are common network nodes which allow other nodes to access files stored on the file servers.

At a fundamental level, LANs provide a frame-work for clients, servers, and other devices to communicate. The frame-work includes physical components such as interface cards, memory buffers, voltage regulators, cabling and the like, which physically connect the nodes. In addition, the framework includes device drivers and other software operating instructions which are executed by the nodes and which control the operation of the physical components. For example, operating instructions enable a client to communicate with other nodes using specific known protocols referred to as protocol stacks or suites. A client's protocol stack modifies its outgoing and incoming data to a form which its physical components can transmit or receive over the network.

When modifying outgoing data generated by an application running on the client, the protocol stack transforms the outgoing data into a series of discrete packets which are then transmitted, usually serially, over physical cabling. Specifically, the protocol stack accepts a number of bits of data to be sent and then prepends or appends additional bits for purposes including error correction, broadcast source node identification, and receiving or destination node identification. The specific modifications depend upon the specific type of protocol being implemented. After creating a modified packet of data, the protocol stack passes the packet to a hardware processing stack of the client which adds hardware specific bits according to the physical configuration of the client.

Conversely, upon receipt of an incoming packet of data, the hardware stack of the client strips the packet of its hardware specific bits, and sends the packet to the protocol stack. Then, the protocol stack strips off the error correction and other protocol specific bits from the packet and sends the data to a destination application.

In 1978, the International Organization of Standards, a world-wide standards setting body, created a network reference model known as the Open Systems Interconnection (OSI) model. The OSI model currently includes seven different conceptual layers: 1) The Physical layer which defines the physical components connecting the node to the network; 2) The Data Link layer which controls the movement of data in discrete forms known as frames and which arranges the data to identify various fields; 3) The Network layer which builds data packets and indicates the type of frame which has been built or must be built by the Data Link layer following a specific protocol; 4) The Transport layer which ensures reliable delivery of data by following a specific protocol which adds to the error correction facilities of the lower levels; 5) The Session layer which allows for two way communications between nodes by controlling communication transfers between connected nodes; 6) The Presentation layer which controls the manner of representing the data, e.g. ASCII or EBCDIC, and ensures that the data is in correct form; and 7) The Application layer which provides protocols and routines for file sharing, message handling, printing protocols and the like. The OSI model has been generally accepted as a reference model for comparison purposes even though many LANs cannot readily be delineated into each of the above-defined layers.

Many early LANs were designed to operate with the specific hardware of the clients running on the LAN, including the network interface cards (NICs) of the clients which provide part of the clients' physical connection to the network itself. These types of LAN designs are largely implemented through programs running on the client, known as network drivers, which control communication with the network utilizing the particular physical configurations.

A major limitation associated with the hardware specific nature of these LANs was that a client could only operate one network layer protocol stackat a time. The client was limited in this manner because each network driver of the client attempted to control the same physical hardware. Due to the asynchronous nature of LAN communications, these drivers had difficulties synchronizing with other drivers which attempted to control the same physical components at the same time. As a result, the client was limited to the operation of a single network layer protocol stack and was not able to simultaneously attach to multiple nodes on a network which were implementing different protocols.

To allow a client to implement more than one network layer protocol, multiple protocol drivers were designed and developed consisting of a single network driver which controls the physical components of the client while allowing the client to implement many commonly used protocol stacks at the same time. Multiple protocol network drivers include two components. First, they provide a single generic interface for hardware designers and protocol designers who need only design their products for a single well-known and well-defined generic interface regardless of the physical components. The generic interface allows the client machine to operate more efficiently by eliminating the need for the client to load and operate a specific driver for every specific protocol.

A second component of multiple protocol drivers is a stack manager which directs data packets to or from the generic interface to or from its appropriate protocol stack. The stack manager operates by acknowledging and binding a protocol stack to the generic interface. Multiple protocol drivers through the stack manager maintain a record of the number and kind of protocol stacks which are loaded into the client's memory.

The client and the multiple protocol network driver operate in the following manner. A client loads, as part of its initialization process, the multiple protocol network driver into memory. Thereafter, multiple compatible protocol stacks may be loaded into memory and bound to the driver. A protocol stack is compatible if the network driver can properly transmit and receive packets from or to that protocol stack without affecting the proper operation of other protocol stacks which are also bound to the driver.

The loading of the various compatible protocol stacks is supervised by the network driver's stack manager which constructs and stores the records necessary to bind each protocol stack to the single driver. Following the steps of loading and binding each protocol stack, client applications may begin to communicate with the network using the bound protocols. To send data to the network, an application will pass the data to be transmitted to a particular protocol stack. The protocol stack implements the protocol and then passes the resulting packet to the generic interface of the driver. In turn, the generic interface accepts the packet and further places it into a well-defined form for transmission by the physical components. Subsequently, the physical components, utilizing the well defined form of the packet, modify the packet according to hardware specifications and transmit the packet to the network.

For incoming data from the network, the sequence of receiving a packet from the network is essentially the reverse process of transmitting a packet. An NIC of the physical components receives an appropriate incoming packet from the network and determines that the packet is destined for the client. The NIC passes the packet to the hardware stack which strips off hardware specific bits and passes the packet to the generic interface. The stack manager of the driver analyzes the packet and then passes the packet to the appropriate protocol stack. Finally, the protocol stack rebuilds the data from the packet stream and passes the data to the application.

As noted above, the multiple protocol drivers can only properly operate with compatible protocol stacks. Usually, a protocol stack is compatible when the stack has been designed to produce and receive packets in the well-defined form utilized by the driver's generic interface. However, even those protocol stacks which are operable with the generic interface may still be incompatible with other protocol stacks. For example, a subsequent protocol stack which implements a protocol that a prior protocol stack is already implementing is incompatible because the driver's stack manager is not able to ascertain to which of the two stacks using the same protocol incoming data should be routed.

The inability of the network driver to operate two protocol stacks which implement the same protocol is generally not problematic for unsophisticated operation of client machines because applications wishing to use a certain protocol may only need to interface with one protocol stack. However, for more sophisticated operation of a client machine, a need arises for the client to run two protocol stacks which do implement the same protocol. One example of a need to simultaneously run two protocol stacks of the same type occurs when an application is using a protocol stack in the Microsoft® MS-DOS® operating system environment (real mode) and another application attempts to use a Microsoft® Windows™ operating system (protected mode) version of the same protocol stack.

To establish an MS-DOS® real mode multiple protocol environment, the client loads the multiple protocol network driver, the real mode protocol stack, and any other compatible protocol stacks into specific areas of its random access memory, called conventional memory. These programs and protocol stacks operate as terminate and stay resident programs (TSRs) which are always in RAM and are usually activated by interrupts generated either by physical hardware, which signifies an incoming data packet from a remote node, or by software interrupts made by MS-DOS® routines attempting to send data to a remote node. These TSRs are said to operate in real mode because they reside in a highly specified and crowded area of RAM called conventional memory. The operation of these TSRs in this area of memory often causes conflict with other programs and data which also require access to this area of RAM. Moreover, most TSRs will under-utilize the capabilities of the client because the TSRs are not designed to work in conjunction with multi-tasking operating systems.

In a Windows™ protected mode operating system environment, the network drivers, protocol stacks, and other layers are loaded into areas of RAM above conventional memory, either expanded or extended memory, depending on how the Windows™ operating system perceives the memory needs of the client. The capacity of extended or expanded memory may be vastly greater than conventional memory and, as a result, far fewer memory conflicts with other applications occur in these areas. Additionally, the Windows™ operating system acts to intercept interrupts and further acts as an intermediary between the network layers and the microprocessor thereby allowing the client machine to perform multi-tasking.

As discussed above, once a real mode protocol stack has been loaded and is operating, it is not possible to run a subsequent protected mode version of a protocol stack which implements the same protocol because the stack manager is not able to differentiate between the two protocol stacks. A solution would be to terminate the real mode protocol stack and transfer communication responsibilities of the applications using the real mode protocol stack to the protected mode protocol stack. Unfortunately, it is tremendously difficult if not, as a practical matter, impossible, to entirely switch from a real mode to a protected mode of operation and still properly maintain and service the prior real mode network connections.

Therefore, in order for a client to maintain existing network connections and still take advantage of the protected mode of operation for subsequent connections, a need exists for the client to be able to concurrently provide a real mode and protected mode protocol stack of the same type.

OBJECTS AND SUMMARY OF THE INVENTION

It is therefore the general object of the present invention to provide a system and method for operating a client machine on a network which simultaneously utilizes multiple protocol stacks implementing the same protocol.

It is a further object of the invention to provide a system and method for operating a client which properly manages unique socket numbers (e.g. ID numbers) associated with each application utilizing the multiple protocol stacks.

It is yet another object of the invention to provide a system and method for operating a client which routes incoming data packets of the particular protocol by pre-scanning a portion of the incoming packet.

It is a related object of the invention to provide a system and method of the above kind that is compatible with currently existing networks and multiple protocol network drivers.

In summary, the invention provides a system and method for operating multiple protocol stacks which implement the same protocol on a single client by accurately routing incoming data packets to the correct protocol stack. Unique socket numbers are generated for each application utilizing the protocol stacks. Prescanning of incoming data packets is performed to determine which protocol stack should receive the packet. In this manner, packets are routed to the appropriate protocol stack which subsequently provides the packet to the appropriate application. Any contention for the packet by incompatible protocol stacks is eliminated thereby ensuring that one protocol stack does not consume all data packets to the exclusion of the others.

DETAILED DESCRIPTION OF THE PREFERRED EMBODIMENT

Turning now to the illustrations, a preferred embodiment of an apparatus according to the invention is shown in the figures and described below.

Figure 1:
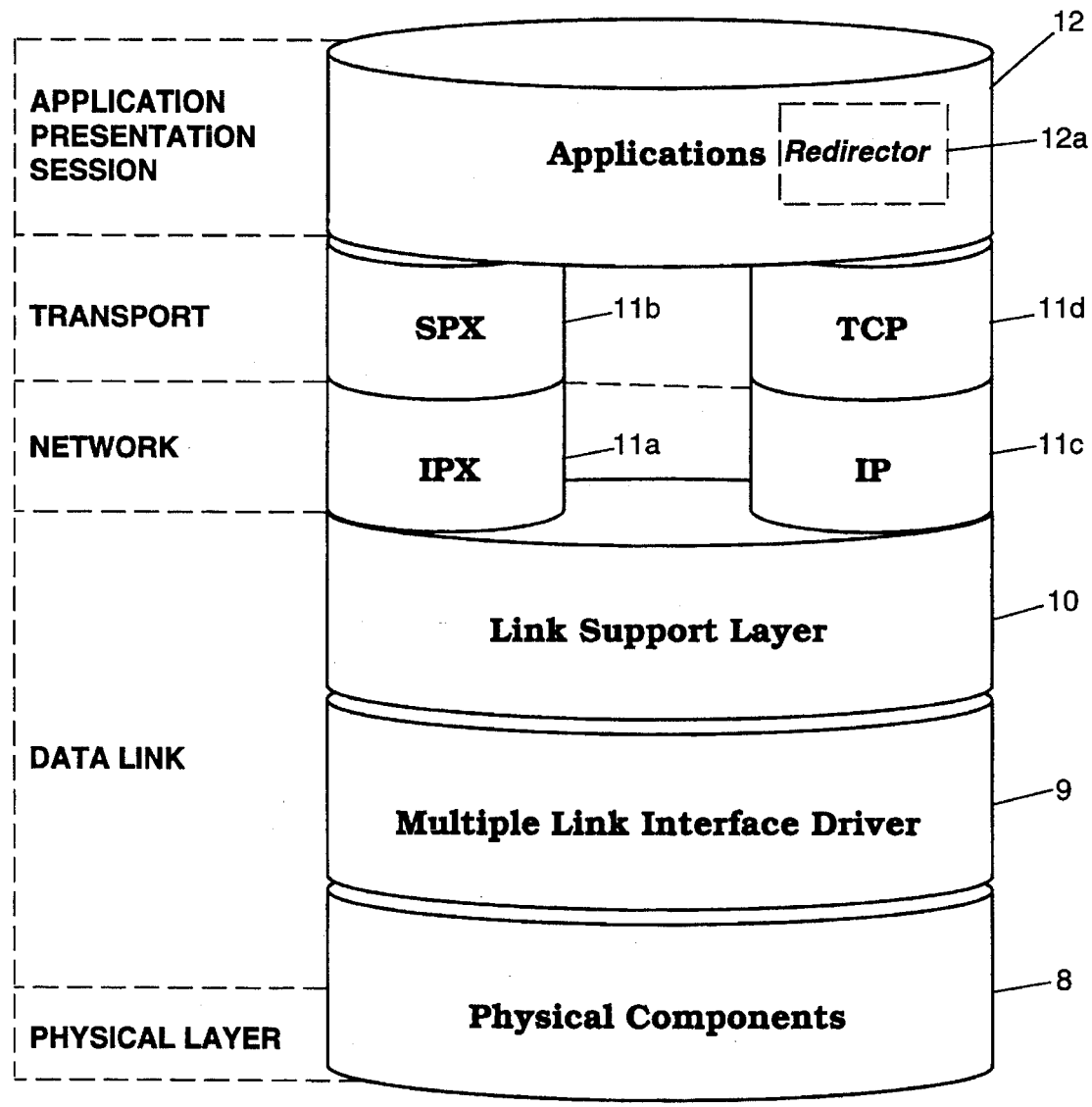
FIG. 1 is a diagram showing the components of a known real mode client network configuration as compared to the components of the OSI network model.

Referring to FIG. 1, therein is shown the components of a known real mode client network configuration as compared to the components of the OSI network model described above in the background section. The seven layers of the OSI model 1–7 are loosely aligned to the five major components 8–12 of FIG. 1 comprising: (1) physical components 8, (2) a Multiple Link Interface Driver (MLID) 9, (3) a Link Support Layer (LSL) 10, (4) protocol stacks 11a through 11d, and (5) client applications 12. The network configuration of FIG. 1 utilizes a multiple protocol network driver specification developed by Novell Corporation, known as the Open Data-Link Interface (ODI)™.

The physical components 8 are at the lowest level of the network configuration and are responsible for the actual interconnection of the LAN nodes for transmission and receipt of data packets. The physical components 8 of FIG. 1 include Network Interface Cards (NICs) with appropriate cabling and support for various frame schemes such as Ethernet as defined by IEEE Standard 802.3.

The MLID 9 acts as an interface between the physical component 8 and the LSL 10. The MLID 9 generally controls the physical transmission and reception of packets to and from the network for a particular hardware configuration and, for that reason, the MLID 9 is associated with the data link layer of the OSI model. The MLID 9 does not, however, interpret the contents of the data packets. For incoming packets received from the network, the MLID 9 receives the packets from the NIC (not shown) of the physical components 8, determines the packet's frame format, strips any specific frame headers, and passes the packet to the LSL 10. For outgoing packets, the process is reversed with the LSL 10 passing a packet to the MLID 9 which determines an appropriate frame format, adds any media specific headers, and passes the packet to the physical components 8.

The LSL 10 in the ODI environment of FIG. 1 acts as a generic interface between the network protocol stacks 11a, 11a, 11c and 11d and the MLID 9. The LSL 10 is also capable of acting as a "stack manager" for controlling packet flow between the protocol stacks and any additional MLIDs (not shown) which may support additional frame schemes, e.g. such as Token Ring (as defined by IEEE Standard 802.5), ARCnet, and the like. In that regard, the LSL 10 is responsible for binding protocol stacks to particular MLIDs and for maintaining and updating a table of all active stacks and MLIDs.

FIG. 1 shows four active types of protocol stacks: 1) an Internetwork Packet Exchange stack (IPX stack 11a), 2) a Sequenced Packet Exchange stack (SPX 11a), 3) an Internet Protocol stack (IP 11c), and 4) Transmission Control Protocol stack (TCP 11d). As is well known in the art, these protocol stacks comprise programs or routines for implementing their respective protocols.

The application component level 12 of the ODI driver interfaces with the protocol stacks 11 in essentially the same manner as application components running on clients operating drivers other than ODI. The manner in which ODI arranges lower components of the environment is generally transparent to the application component level. In FIG. 1, the application component level 12 comprises a Netware™ version 4.x shell redirector 12a. The redirector 12a provides file messaging services between applications on a network as well as file services to applications, such as open, close, read and write.

Once the ODI environment of FIG.1 has been established, the redirector 12a (or any other client application) sends outgoing packets of data destined for the network to one of the memory resident protocol stacks 11a through 11d. After receiving a communication from one of the protocol stacks, the LSL 10 sends the communication packet destined for a network node ("outgoing packets") to the MLID 9 which, in turn, passes the packet to the physical components for transmission over the LAN medium. Conversely, for incoming packets destined for client applications, the LSL 10 receives the packets from the MLID 9 which has received the packets from the physical components 8. The LSL 10 must then determine to which protocol stack the incoming packet should be passed.

To that end, the LSL 10 examines the protocol field to ascertain the protocol ID of the incoming packet and presents the packet to the protocol that is bound with that protocol ID. Since there can only be one bound protocol for any particular protocol ID, LSL 10 cannot support multiple protocol stacks of the same type. In this regard, two protocol stacks of the same type are incompatible with each other and LSL 10.

Figure 2:
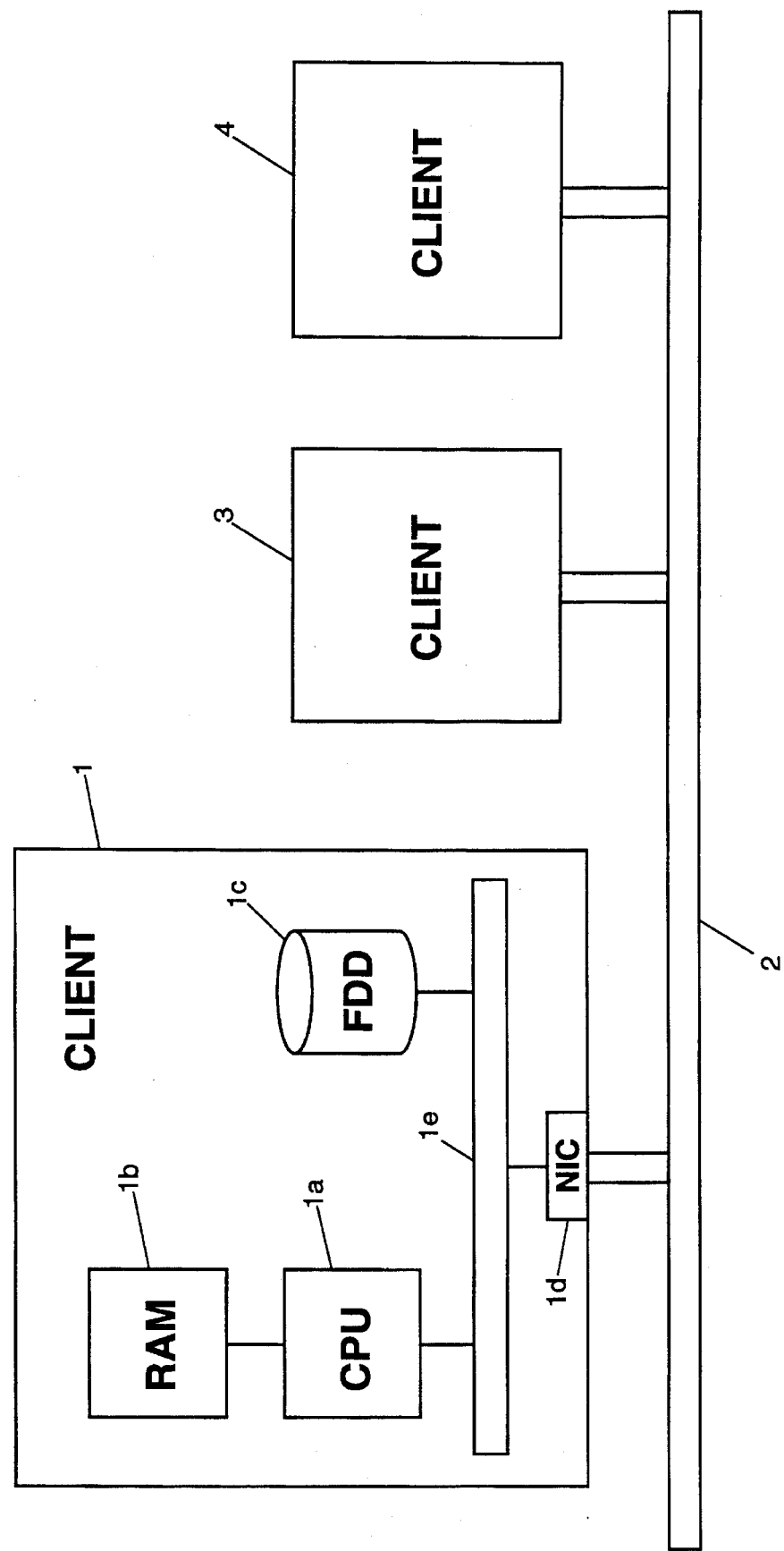
FIG. 2 is a schematic diagram of a preferred embodiment of the present invention—in the form of a client system suitable for running multiple incompatible protocols— connected to a Local Area Network.

FIG. 2 is a schematic diagram of a preferred embodiment of the present invention —in the form of a client system suitable for running multiple incompatible protocols — connected to a Local Area Network. The LAN of FIG. 2 comprises 3 clients (client 1, client 3 and client 4) which are interconnected by appropriate cabling 2 and support an Ethernet frame scheme. Client 1 is representative of the other clients 3 and 4 and is attached to the network cabling via an NIC 1d. Client 1 also includes a microprocessor (CPU) 1a, a RAM 1b and a fixed disk drive (FDD) 1c which communicate via internal data bus 1e. The CPU 1a may be an Intel 80486 and the client 1 is preferably computer workstation running the Microsoft® Windows™ and MS-DOS® operating systems. While certain elements used in the illustrative embodiment of the present invention are specifically identified herein, many variations and substitutions, known to those skilled in the art, can be employed without deviating from the intended scope of the present invention.

Figure 3:
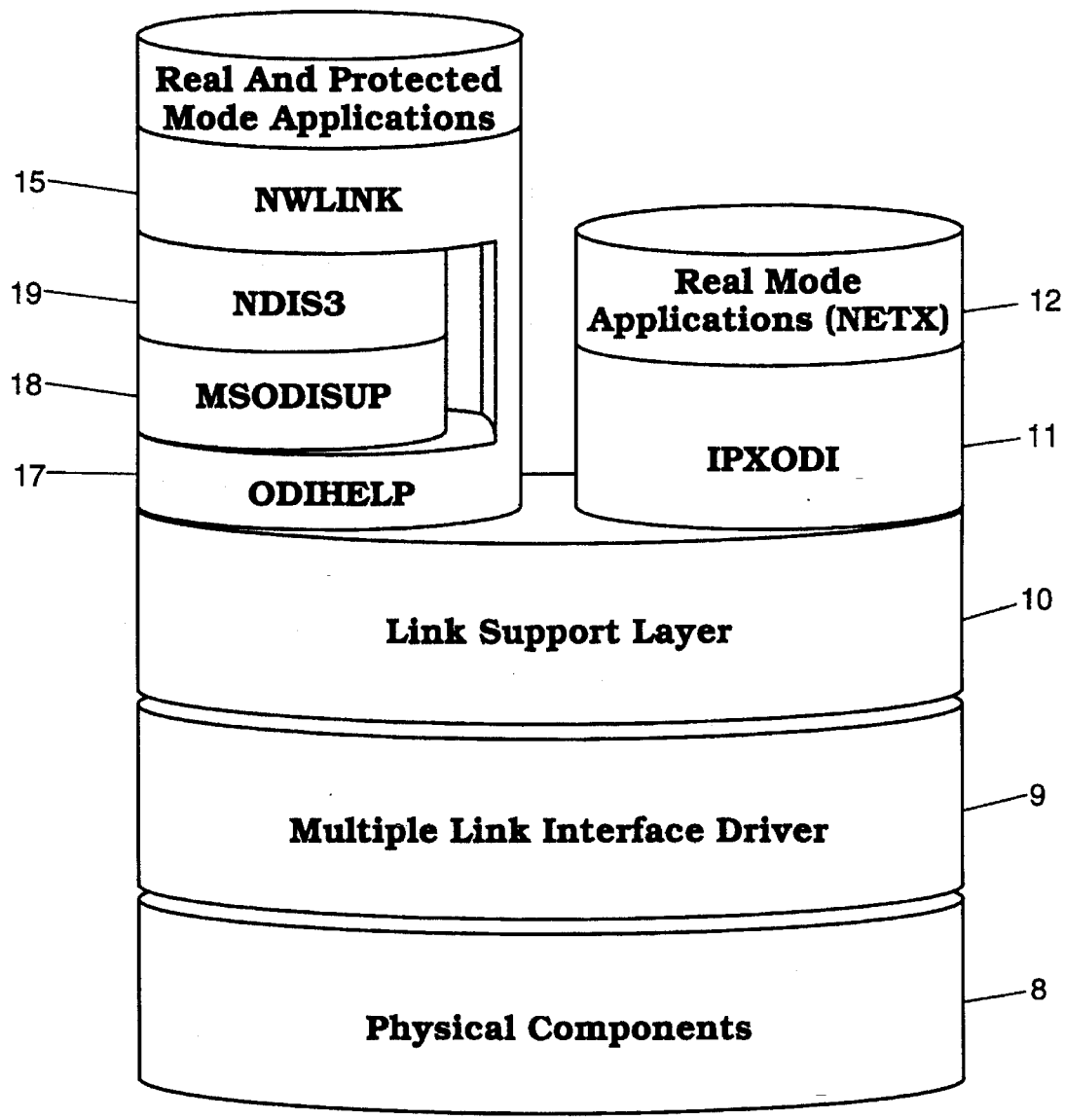
FIG. 3 is a diagram showing the components of the client network configuration of the preferred embodiment of FIG. 2.

FIG. 3 shows the components of the client network configuration of FIG. 2 which enable the client 1 to run multiple protocol stacks of the same type. The referenced numerals in FIG. 3 correspond to the same components of FIG. 1 and function the same. In addition, FIG. 3 has additional real mode and protected mode components. One component, NWLINK 15 provides, among other things, the functionality of a 32 bit protected mode IPX protocol stack.

As shown diagrammatically in FIG. 3, a real mode IPXODI protocol stack 11 is also being implemented. NWLINK 15 intelligently recognizes the existence of IPXODI 11. NWLINK 15, because LSL 10 is unable to directly service both IPX stacks, automatically implements bimodal behavior which allows a client to operate in a first mode with a single IPX stack or in a second mode with both IPX stacks. A real mode component, ODIHELP 17, operates between LSL 10 and NWLINK 15 as the prescan module. LSL 10 provides for a module to register as the prescan module. Thereafter, all incoming packets are offered to the prescan module before being offered to any of the bound protocol stacks. If neither the prescan module nor a bound stack consume the packet, LSL 10 offers the packet to its default module. Since ODIHELP 17 has registered as prescan, LSL 10 first offers incoming packets to ODIHELP 17 before LSL 10 offers the packets to any bound protocol stack.

During prescan, ODIHELP 17 determines whether the incoming packet belongs to the protected mode NWLINK 15 stack or some other stack. First, ODIHELP 17 checks the packet type contained in the packet header to determine whether the packet is using an IPX stack. If not, the packet is returned to the LSL 10. If the packet is using the IPX protocol, ODIHELP 17 checks the unique socket number of the packet contained in the header to see if the socket number matches a socket number used by the NWLINK 15 stack. If not, the packet is returned to the LSL 10. If so, ODIHELP 17 consumes the packet so long as NWLINK 15 has sufficient buffer space to receive the packet. If there is insufficient buffer space, the packet is returned to the LSL 10 with instructions to discard the packet.

If the packet is neither consumed by NWLINK 15 nor thrown away, then the LSL 10 offers the packet to the protocol stack which is bound to the protocol ID of the packet. In the case where the bound protocol stack does not consume the packet, the LSL 10 again presents the packet to ODIHELP 17 through the standard ODI configuration's default module. Although ODIHELP 17 has already determined that NWLINK 15 does not want the packet, ODIHELP 17 presents the packet to a protected mode module MSODISUP 18 which provides Media Access Control (MAC) support for an additional protected mode module NDIS3 19. NDIS3 19 acts as the driver and generic interface for the protected mode protocol stacks, including NWLINK 15. Accordingly, NDIS3 19 offers the packet to any existing protocol stacks which are utilizing the protected mode application layer, including NWLINK 15, such as a TCP/IP stack for example.

The IPX protocol requires that each application on a client using the stack be assigned a unique socket number, thereby ensuring that requests to and from the network can be associated with the proper requesting or destination application. Since two IPX protocol stacks are operating concurrently in the present invention, in order to ensure that the same socket number is not assigned to multiple applications on the same client, the present invention employs a novel socket management scheme.

Generally, the transport layer protocol stacks are responsible for assigning socket numbers. Accordingly, both the real mode IPXODI stack 11 and NWLINK 15 maintain open socket tables which track available socket numbers and socket numbers that are assigned to client applications. Since the IPXODI stack 11 is unaware of the existence of NWLINK 15, it maintains the primary socket table. Applications employing the IPXODI stack 11 may either request a specific socket number or may ask the IPXODI stack 11 to assign any available socket number to the application by issuing a dynamic open socket request.

Applications using NWLINK 15 request socket numbers from NWLINK 15 in the same way. Before an application is able to send or receive data from the network through NWLINK 15, the application must first be assigned a unique socket number. Thereafter, the application is bound to NWLINK 15 until it terminates communications with the network. To ensure a unique socket number is assigned, when NWLINK 15 receives a request for a socket number, it passes the request to the IPXODI stack 11. If the socket request is denied by the IPXODI stack 11, NWLINK 15 informs the requesting application. If the socket request is granted, NWLINK 15 updates its socket table accordingly. In this manner, the socket table of NWLINK 15 maintains a list of all of its active sockets while the primary socket table of the IPXODI stack 11 maintains a list of all active sockets for both IPX protocol stacks.

In FIG. 3, NWLINK 15 is shown connected to ODIHELP 17. The connection between NWLINK 15 and ODIHELP 17 is not a data path for the transmission of data packets. NWLINK 15 receives and sends data packets through NDIS3 19. NWLINK 15 provides ODIHELP 17 with its active socket numbers by maintaining the socket numbers in real mode memory. In operation, ODIHELP 17 compares the socket numbers provided by NWLINK 15 with the socket numbers of incoming packets to determine whether the packet is destined for an application using NWLINK 15.

Figure 4:
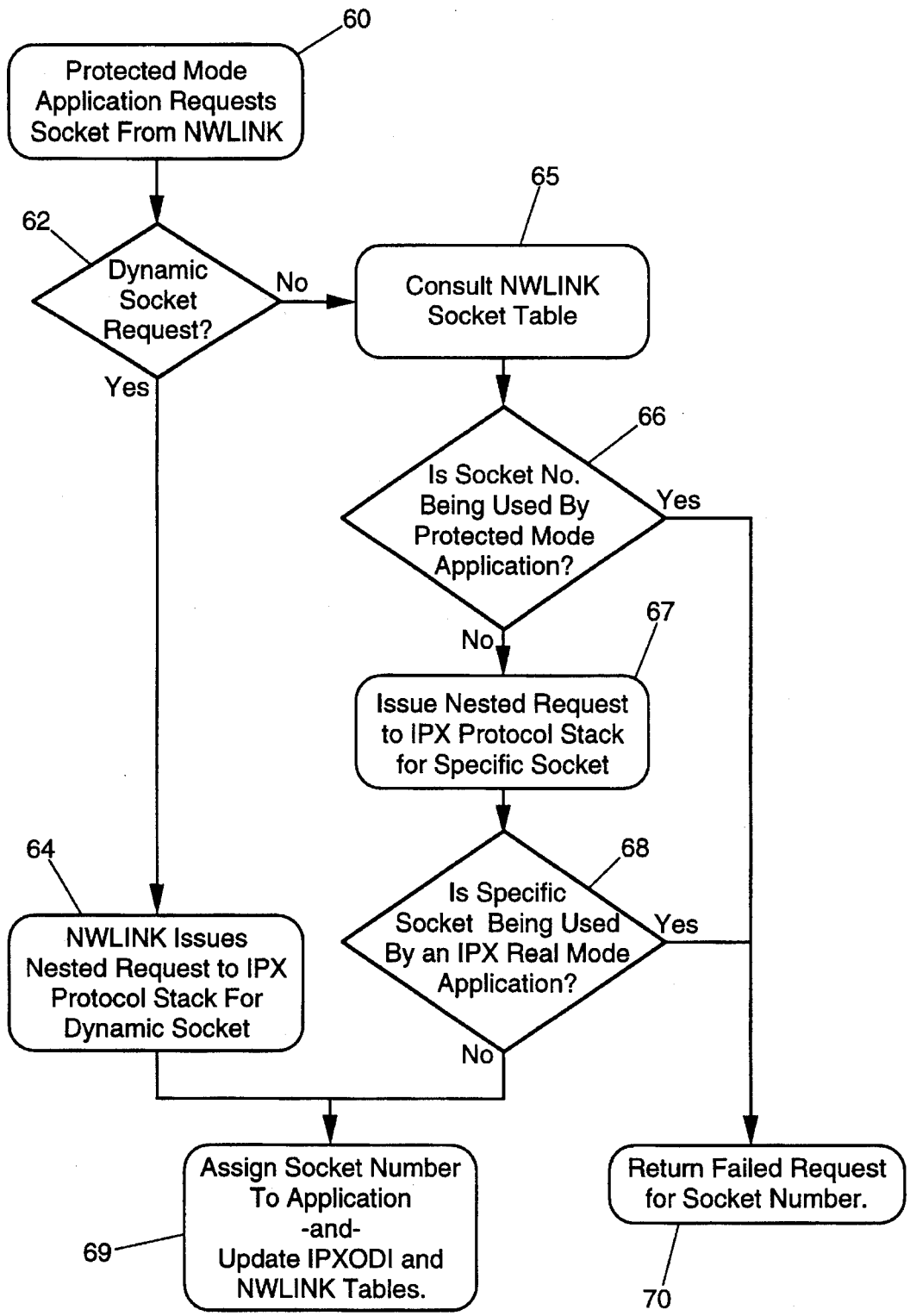
FIG. 4 is a flow chart showing the steps employed by the preferred embodiment of FIG. 2. to assign and maintain unique socket numbers for applications running on the client.

FIG. 4 is a flow chart showing the steps employed to assign and maintain socket numbers for applications which communicate through NWLINK 15. Beginning at step 60, an application requests a socket number from NWLINK 15. NWLINK 15 then determines whether the application or process has issued a dynamic or specific request for a socket number (step 62). If the application has issued a dynamic socket request, NWLINK 15 issues a nested request to the IPXODI stack 11 to assign a dynamic socket number (step 64). At step 69, NWLINK 15 notifies the application of the socket number assigned to it and updates its socket table, which it stores in global memory.

If the application issues a specific socket request at step 62, NWLINK 15 first checks its own socket table to determine whether that socket number has already been assigned (step 65). If NWLINK 15 determines that the socket number has already been assigned, it will deny the specific socket request and inform the application of the denial (step 70).

However, if the protected protocol stack does not find a match in its socket table, it issues a nested request to the IPXODI stack 11 for the specific socket number (step 67). The IPXODI stack 11 at step 68 then determines from its socket table whether the specific socket number has been assigned to any of its applications. If so, the IPXODI stack 11 denies the request of NWLINK 15 which, in turn, denies the request of the application (step 70). If the specific socket number has not been assigned, the IPXODI stack 11 assigns the requested socket number to the NWLINK 15 stack which, at step 69, assigns the requested socket number to the application and updates its socket table.

Certain socket numbers are reserved by IPX in the ODI environment and require special considerations. For example, socket number 453 is reserved for RIP requests wherein a node polls the network to discover an unknown address of another node. Accordingly, there is contention between NWLINK 15 and IPXODI 11 which may both want to receive data packets with socket numbers 453. To resolve the conflict, ODIHELP 17 only consumes 453 socket packets when an NWLINK 15 application makes a specific RIP request. Moreover, if the request is not satisfied within a certain amount of time (Approximately 20 seconds in the preferred embodiment shown), NWLINK 15 abandons (times out) its consumption of 453 socket packets until the same retry period has expired. In this manner, NWLINK 15 does not continuously consume all the 453 socket packets to the exclusion of the IPXODI stack 11. After a certain amount of retries and fails, NWLINK 15 sends a fail to the application making the RIP request.

Similarly, socket number 456 is reserved for an IPX Diagnostic Responder. The IPX Diagnostic Responder is a network management tool which allows remote workstations to ask for information about what IPX machines are active on the network. In the case where an IPXODI 11 application requests local diagnostic information, the request is not transmitted to the network. Instead, the request is serviced and looped back to the application through the Diagnostic Responder of IPXODI 11. Requests for diagnostic information from applications using NWLINK 15 are similarly serviced and looped back by MSODISUP 18. In the case of diagnostic requests from other clients on the network, ODIHELP 17 ignores 456 socket packets during prescan thereby allowing IPXODI 11 to service these requests.

Figure 5:
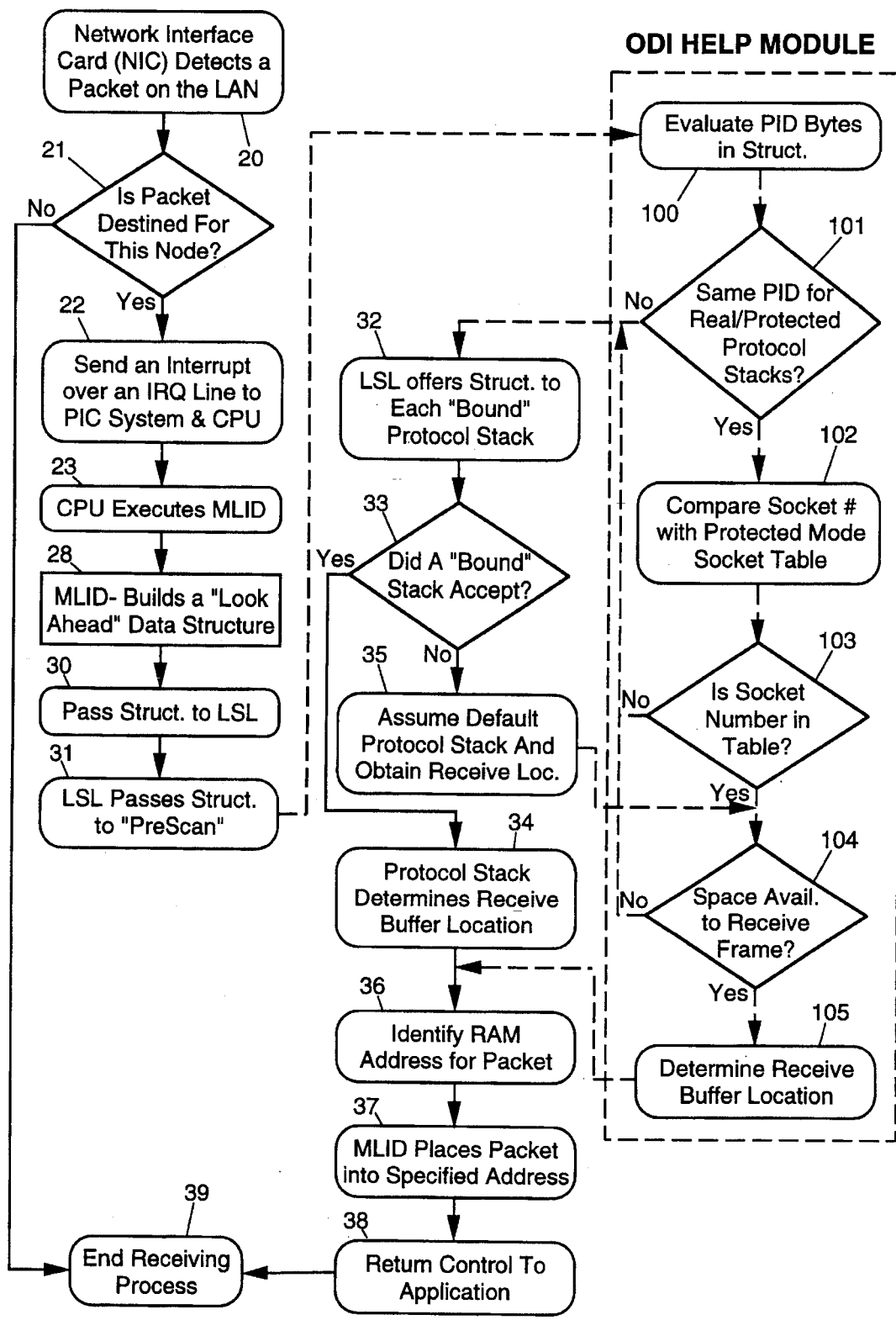
FIG. 5 is a flowchart of the typical manner in which the preferred embodiment of FIG. 2 is used and operates.

The flowchart of FIG. 5 shows the typical manner in which the invention is used and operates. Steps 20 and 21 shown in FIG. 5 illustrate the first steps in receiving a packet. In the first step, step 20, the NIC 1d of the physical components 8 detects an incoming packet sent by another node on the LAN. After detecting the incoming packet, the NIC 1d evaluates the packet to determine whether the packet is destined for the NIC's node. As is well known in the art, the NIC 1d has a RAM buffer which temporarily receives the packet and a comparator which compares the packet's destination address with the NIC1 d unique node address. As a result of step 21, if the NIC1 d determines that the incoming packet is not destined for its node, the NIC 1 d, depending on the LAN configuration, discards the packet and terminates the packet receiving process as indicated by step 39.

However, if the NIC1 d determines that the packet is destined for the NIC's node, it will capture the packet in its RAM and will issue a hardware interrupt to the CPU 1a as indicated in step 22. The NIC1 d is indirectly connected to the CPU 1a by means of shared or direct memory, input and output lines (I/O), and interrupt/IRQ lines (not shown). The IRQ lines are connected to a Programmable Interrupt Controller (PIC) which is connected to the CPU 1a. Once the CPU 1a receives the NIC's interrupt, the CPU 1a at step 23 executes an interrupt service routine for MLID 9 which operates as a TSR program residing in an appropriate area of the client's RAM memory. Subsequently, the MLID 9 routine builds a look ahead data structure (at step 28) which includes essential information about the packet such as the protocol of the packet (protocol ID), the length of the packet, the frame type, and a portion of the protocol stack's header. The MLID 9 routine, as indicated in step 30, then passes the look ahead data structure to the LSL 10.

The LSL 10, in turn, presents the look ahead data structure to ODIHELP 17, which acts as a prescan module (step 31). ODIHELP 17 first evaluates the look ahead structure (step 100) to determine at step 101 whether the protocol of the packet is the same protocol implemented by the real and protected mode stacks, i.e. the IPX protocol stack in the described embodiment. ODIHELP 17 accomplishes this determination by examining the Protocol Identification (PID) byte in the look ahead data structure. If, in step 101, the PID byte of the packet does not match the PID of the protocol implemented by the real and protected stacks, ODIHELP 17 does not accept the packet and thereby allows other protocol stacks to receive the packet.

However, if the packet's protocol as specified by the PID is the same as the protocol implemented by the real and protected mode stacks, ODIHELP 17 then compares the socket number of the look ahead data structure with the socket table of the protected mode NWLINK 15 stack (step 102). If the socket number does not match an active NWLINK 15 protected mode application, ODIHELP 17 does not accept the packet (step 103). If the socket number matches, ODIHELP 17 attempts to consume the entire incoming packet. Specifically, ODIHELP 17 determines if sufficient buffer space exists to receive the incoming packet (step 104). If sufficient space exists, ODIHELP 17 will obtain a receive buffer location (step 105) and specify a RAM location (through the LSL 10) for the MLID 9 to send the incoming packet (step 36). The MLID 9 then sends the incoming packet to the specified memory location (step 37), returns control of the CPU 1a to the original application that was interrupted (step 38), and ends the receiving process (step 39). However, if there is insufficient buffer space to receive the packet at step 104, ODIHELP 17 will consume the packet but will not use it.

If the packet was not accepted by a prescan stack, at step 32 the LSL 10 presents the look ahead structure to the appropriate bound protocol stack. If the bound protocol accepts the packet, then the protocol stack determines a receive buffer location (step 34) and provides the same to MLID 9 (step 36). MLID 9 then sends the incoming packet to the specified memory location (step 37), returns control of the CPU 1a to the original application that was interrupted (step 38), and ends the receiving process (step 39). However, if the bound protocol stack does not consume the incoming packet (step 33), the packet is sent again to ODIHELP 17, which now acts as the default protocol stack (step 35). If space is available (step 104), ODIHELP 17 consumes the packet by providing a real mode address to MLID 9 to store the packet and end the real mode portion of the receiving process as described above. If there is insufficient buffer space to receive the packet at step 104, then ODIHELP 17 discards the packet at this point and does not return the packet to the LSL 10.

After ODIHELP 17 consumes an incoming data packet, ODIHELP 17 must transfer the data packet from its real mode memory buffer to the protected mode memory buffer of MSODISUP 18. A certain amount of cost (from a resource allocation standpoint) is associated with such a transfer. Accordingly, ODIHELP maintains a table to determine whether the transfer is warranted. Transfers only take place if MSODISUP 18 has an open buffer space available to receive the incoming packet.

Accordingly, a table maintained by ODIHELP 17 includes the socket numbers of each application using NWLINK 15 as well as three (3) single bit flags for each socket number which identify whether any 1) listens, 2) look aheads, or 3) SPX connections, are available. If not, the costly real mode to protect mode data transfer is not performed. Otherwise, ODIHELP 17 transfers the data to NWLINK 15 through modules MSODISUP 18 and NDIS3 19.

Thus, in the above described manner, the invention is able to route incoming packets to multiple incompatible protocol stacks by prescanning and socket management. Given the foregoing, it is noted that a common circumstance where the invention is beneficially employed includes the situation where the client attempts to implement a protected mode protocol stack after a real mode network protocol stack has already been implemented. While many applications as initiated could simply use the real mode protocol stack, it is often highly advantageous for subsequently spawned applications to utilize the speed and performance benefits of the protected mode stack while still providing support for applications which are already bound to the real mode protocol stack.

Although the foregoing detailed description of a preferred embodiment concentrated on a description of the invention within the ODI environment, it is not intended to limit the invention to operation solely within said specific environment. Rather, the invention and the principles herein disclosed may have broad applicability as can be appreciated by those skilled in the art.

What is claimed is:

1. A method for running multiple protocol stacks implementing the same protocol on a network client having a generic interface which is capable of receiving incoming data packets destined for applications running on the client and presenting the data packets to multiple protocol stacks for consumption, comprising the steps of:

generating and maintaining a unique identifier for each application that is associated with the multiple protocol stacks of the same type;

prescanning the incoming data packets received by the generic interface to determine if the incoming data packets contain unique identifiers of any of the applications;

providing the incoming data packets to the applications associated with the prescanned unique identifiers.

2. The method of claim 1 wherein the step of prescanning involves viewing only a portion of the incoming data packets, said portion comprising the packet type and socket number.

3. The method of claim 1 wherein the step of maintaining a unique identifier for each application includes the step of storing unique identifiers in a memory table and the step of determining if the incoming data packets contain unique identifiers of any of the applications involves the step of referencing the memory table.

4. The method of claim 1 wherein the protocol stacks implementing the same protocol comprise a real mode and a protected mode protocol stack.

5. The method of claim 4 wherein the prescanning is performed by a prescan module which determines if the incoming data packet belongs to the protected mode stack by checking the protocol type and the socket number of the data packet.

6. The method of claim 5 wherein the prescan module releases the data packet for consumption by any other protocol stacks if it determines that the incoming data packet does not belong to the protected mode stack.

7. The method of claim 6 wherein the real mode and protected mode protocol stacks employ an IPX compatible protocol.

8. The method of claim 1 wherein the step of providing the incoming data packets to the applications associated with the prescanned unique identifiers includes the intermediate step of providing the incoming data packet to the appropriate protocol stack which in turn provides the incoming data packet to the application.

9. The method of claim 8 wherein the step of providing the incoming data packets to the applications associated with the prescanned unique identifiers comprises referencing a table in memory to determine if there is sufficient buffer space to receive the incoming data packet.

10. The method of claim 1 wherein the step of generating and maintaining a unique identifier for each application that is associated with the multiple protocol stacks of the same type comprises:

maintaining, by a first protocol stack of the same type, a secondary socket table of unique socket numbers associated with applications using the first stack;

maintaining, by a second protocol stack of the same type, a primary socket table of unique socket numbers associated with applications using the second stack and the first stack;

requesting by the first stack a unique socket number from the second stack to be associated with an application using the first stack;

generating by the second stack a unique socket number in response to the request of the first stack; and providing by the first stack said unique socket number to said application using the first stack.

11. A method for running first and second protocol stacks which are incompatible with each other on a network client having a generic interface which is capable of receiving incoming data packets destined for applications running on the client and presenting the data packets to multiple compatible protocol stacks for consumption, comprising the steps of:

maintaining a primary table of socket numbers for each application that is associated with the incompatible protocol stacks;

generating unique socket numbers for subsequent applications which request to be associated with the incompatible protocol stacks;

maintaining a second table of socket numbers for each application associated with the second incompatible protocol stack;

referencing the second table to determine if the socket numbers of the incoming data packets are associated with the second incompatible protocol stack; and providing the incoming data packets to the applications associated with the second incompatible protocol whose socket numbers match the socket numbers of incoming data packets.

12. The method of claim 11 wherein the protocol stacks which are incompatible comprise a real mode and a protected mode protocol stacks.

13. The method of claim 12 further comprising prescanning a portion of the incoming data packets, said portion comprising the packet type and socket number.

14. The method of claim 13 wherein the prescanning is performed by a prescan module which determines if the incoming data packet belongs to the protected mode stack by checking the protocol type and the socket number of the data packet.

15. The method of claim 14 wherein the prescan module releases the data packet for consumption by any other protocol stacks if it determines that the incoming data packet does not belong to the protected mode stack.

16. The method of claim 15 wherein the real mode and protected mode protocol stacks employ an IPX compatible protocol.

17. In a network environment wherein nodes on the network communicate through network interface hardware by sending and receiving data packets on the network interface hardware from multiple protocol stacks, a network driver capable of handling incoming data packets from protocol stacks implementing the same protocol comprising:

a socket manager for generating and maintaining a unique identifier for each application that is associated with the multiple protocol stacks of the same type;

a prescan module for prescanning and analyzing incoming data packets received by the network interface hardware to determine if the incoming data packets contain unique identifiers associated with any of the applications associated with protocol stacks of the same type;

a stack manager for routing an incoming data packet through the appropriate protocol stack to the application associated with the prescanned unique identifier.

18. The network driver of claim 17 wherein the prescan module is operable to view only a portion of the incoming data packets, said portion comprising the packet type and socket number.

19. The network driver of claim 17 wherein the stack manager is operable to store the unique identifiers in a memory table and the prescan module is operable to determine if the incoming data packets contain unique identifiers of any of the applications by referencing the memory table.

20. The network driver of claim 17 wherein the protocol stacks implementing the same protocol comprise a real mode and a protected mode protocol stack.

21. The network driver of claim 20 wherein the prescan module is operable to determine if the incoming data packet belongs to the protected mode stack by checking the protocol type and the socket number of the data packet.

22. The network driver of claim 21 wherein the prescan module is operable to release the data packet for consumption by any other protocol stacks if it determines that the incoming data packet does not belong to the protected mode stack.

23. The network driver of claim 22 wherein the real mode and protected mode protocol stacks employ an IPX compatible protocol.

24. The network driver of claim 17 wherein the socket manager is operable to:

maintain a secondary socket table of unique socket numbers associated with applications using a first protocol stack of the same type as a second protocol stack;

request a unique socket number from the second stack to be associated with an application using the first stack;

provide the unique socket number generated by the second stack to said application using the first stack.

* * * * *